US006756029B2

United States Patent
Lam et al.

(10) Patent No.: US 6,756,029 B2
(45) Date of Patent: Jun. 29, 2004

(54) MOLECULAR SIEVES OF FAUJASITE STRUCTURE

(75) Inventors: Yiu Lau Lam, Rio de Janeiro (BR); Alvaro Saavedra, Rio de Janeiro (BR); Alexandre de Figueiredo Costa, Rio de Janeiro (BR); Anselmo da Silva Santos, Rio de Janeiro (BR); Gustavo Torres Moure, Rio de Janeiro (BR); Rodolfo Eugenio Roncolatto, Niteroi (BR); Dennis Stamires, Newport Beach, CA (US); Paul O'Connor, Hoevelaken (NL)

(73) Assignees: Petroleo Brasileiro S.A.-Petrobras (BR); Akzo Nobel N.V. (NL)

( * ) Notice: Subject to any disclaimer, the term of this patent is extended or adjusted under 35 U.S.C. 154(b) by 119 days.

(21) Appl. No.: 10/164,926

(22) Filed: Jun. 7, 2002

(65) Prior Publication Data

US 2003/0044350 A1 Mar. 6, 2003

Related U.S. Application Data

(63) Continuation-in-part of application No. 09/637,244, filed on Aug. 11, 2000, now abandoned, which is a continuation-in-part of application No. 09/372,556, filed on Aug. 11, 1999, now abandoned.

(51) Int. Cl.$^7$ .............................. C01B 39/24; B01J 29/08

(52) U.S. Cl. ............... 423/716; 423/709; 423/DIG. 21; 502/85; 208/120.1

(58) Field of Search .................................. 423/700, 712, 423/716, 709, DIG. 21; 502/79; 208/120.01

(56) References Cited

U.S. PATENT DOCUMENTS

| | | | |
|---|---|---|---|
| 3,459,645 A | 8/1969 | Wilson et al. | |
| 3,506,594 A | 4/1970 | Haden et al. | |
| 3,594,121 A | 7/1971 | Weber | 423/700 |
| 3,657,154 A | 4/1972 | Haden et al. | |
| 4,235,753 A | 11/1980 | Brown et al. | |
| 4,493,902 A | 1/1985 | Brown et al. | 502/65 |
| 4,587,115 A | 5/1986 | Arika et al. | |
| 5,716,593 A | 2/1998 | Miller | 423/702 |
| 5,785,944 A | 7/1998 | Miller | 423/700 |
| 6,004,527 A | 12/1999 | Murrell et al. | 423/712 |
| 6,022,519 A | 2/2000 | Shimizu et al. | 423/700 |
| 6,569,400 B1 * | 5/2003 | Sterte et al. | 423/700 |
| 2002/0041845 A1 * | 4/2002 | Oku et al. | 423/705 |

FOREIGN PATENT DOCUMENTS

| | | | |
|---|---|---|---|
| CA | 922487 A | 3/1973 | |
| GB | 2 166 971 | 5/1986 | B01J/21/12 |

OTHER PUBLICATIONS

X. Wenyang, et al., *Journal of Chemical Communication, A Novel Method for the Preparation of Zeolite ZSM–5*, vol. 10, 1990, pp. 755–756.

(List continued on next page.)

*Primary Examiner*—David Sampple
(74) *Attorney, Agent, or Firm*—Louis A. Morris

(57) ABSTRACT

A process for preparing molecular sieves of type Y faujasite structure is described, as well as pre-shaped bodies of faujasite structure type Y molecular sieves. The process comprises preparing a precursor gel from a source of silica-alumina or a source of alumina and a source of silica with a template agent at a $SiO_2/Al_2O_3$ greater than 7 and suitable for forming a type Y zeolite, drying the precursor gel and contacting the dried precursor gel with steam, optionally followed by caustic washing, without the formation of crystalline phases other than type Y zeolite being observed. Advantageously, the pre-shaped bodies prepared with the precursor gel of Y zeolite, when subjected to the process of the invention, will have their outer surface covered by type Y zeolite crystals. The molecular sieves so obtained may be employed as catalysts or adsorbents in various processes of the chemical or oil industry.

41 Claims, 8 Drawing Sheets

OTHER PUBLICATIONS

J. Dong and P. Dong, Shiyou Huagong, vol. 24, 1995, pp. 321–324, w/ abstract attached, abstract No. 123: 36436u, *Progress in the synthesis of zeolite by vapor phase method.*

Man–Hoe Kim, Hong–Xin Li and Mark E. Davis, *Synthesis of zeolites by water–organic vapor–phase transport,* Microporous Materials, vol. 1 (1993) pp. 191–200.

*Sol–Gel Science, The Physics and Chemistry of Sol–Gel Processing,* C. J. Brink, G.W. Scherer in Sol–Gel Science Chapter 13, 1996.

E. L. Kugler and D. P. Leta, *Nickel and Vanadium on Equilibrium Cracking Catalysts by Imaging Secondary Ion Mass Spectrometry,* Journal of Catalysis, vol. 109, pp. 387–395 )1988).

S. Kasahara, K. Itabashi, K. Igawa, *Clear Aqueous Nuclei Solution for Faujasity Synthesis,* pp. 185–192. (No Date Available).

Abstract of Chinese Patent No. *1015334,* May, 1991.

*Bulletin of the Chemical Society of Japan,* Masahiko Matsukata and Eiichi Kikuchi, pp. 2341–2356, vol. 70. (1997).

*Applied Surface Science,* J.K. Lampert, et al., *Fluid catalytic cracking catalyst mirostructure as determined by a scanning ion micrprobe,* vol. 55, pp. 149–158, (1992).

* cited by examiner

MOLECULAR SIEVES OF FAUJASITE STRUCTURE

CROSS REFERENCE TO RELATED APPLICATIONS

This application is a continuation-in-part of U.S. patent application Ser. No. 09/637,244, filed Aug. 11, 2000, now abandoned which is a continuation-in-part of U.S. patent application Ser. No. 09/372,556, filed Aug. 11, 1999 now abandoned.

FIELD OF THE INVENTION

The present invention relates to a process for preparing molecular sieves of faujasite structure and to the pre-shaped molecular sieve bodies prepared according to the present process. More specifically, the present invention relates to a process for preparing molecular sieves of faujasite structure which comprises contacting a precursor gel with steam, optionally followed by caustic washing, said process making it possible to form a zeolite of faujasite structure in pre-shaped bodies.

BACKGROUND INFORMATION

The aluminosilicates known as zeolites are highly complex chemical structures which present different crystalline structures as a function of their composition. Although they occur naturally, zeolites nowadays are mostly produced by industry aiming at various uses, the more important among which are application as adsorbents and as catalysts in the oil industry.

Among the various kinds of synthetic zeolites used in the oil industry, the one most frequently used is the zeolite of faujasite structure, which after its synthesis may show a molar composition according to the formula below:

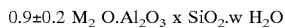

$$0.9 \pm 0.2 \, M_2 O \cdot Al_2O_3 \cdot x \, SiO_2 \cdot w \, H_2O$$

wherein M represents a cation of an alkaline metal, x is a number between 2.5 and 6, and w is a number between 6 and 9.

When preparing faujasite zeolites, the molar ratio between the oxides of aluminum and silicon is a further parameter which may be adjusted. As found in natural environments, the faujasite $SiO_2/Al_2O_3$ molar ratio is between 2.5 and 4. Synthetic zeolites of faujasite structure of higher $SiO_2/Al_2O_3$ molar ratio have been prepared, since it was found that structures with a higher silica content are more resistant to temperature and acids, situations which are usually encountered in the application of zeolites in the oil industry.

A faujasite structure zeolite used mainly in industry, and especially in the oil industry, is the type Y zeolite, where the $SiO_2/Al_2O_3$ molar ratio is higher than 4.5. The molar ratio of zeolites for use in fluid catalytic cracking catalysts, for example, is at least 5.0. However, the preparation of zeolites having such higher $SiO_2/Al_2O_3$ molar ratio presents several drawbacks, since generally those zeolites are obtained through processes of extended periods of crystallization, which require huge crystallization vessels and a sharp control of the overall production process to avoid impurities, namely, different crystalline phases, which harm the end product.

In spite of these drawbacks, various industrial processes for obtaining type Y zeolites are presently in use, so crucial is the importance of this material in the production of more active and more selective catalysts for the oil industry. One such process which widely employs the type Y zeolite in the composition of catalysts is the fluid catalytic cracking process.

Brazilian Patent BR 8402808, for example, teaches a process for preparing a high-silica, faujasite zeolite to be used in fluid catalytic cracking, where sodium silicate and aluminum sulfate are contacted under controlled conditions of pH and temperature, the crystallization periods varying between 0.5 and 12 hours. The product is a Y zeolite of $SiO_2/Al_2O_3$ molar ratio 5.6.

More detailed research on the preparation of type Y zeolite will reveal that most processes still in use employ the same operation sequences detailed in the above Brazilian Patent, the only variations concerning the raw materials and the formulation of the recipes. One could even say that nothing novel is to be expected in this field.

It is therefore clear to the experts in the production of catalysts and adsorbents that there is an unfulfilled need to develop new processes for preparing a type Y zeolite, processes which are more selective in order to avoid forming impurities, more economical, and most of all, capable of producing Y zeolites having features not yet attained by the state-of-the-art preparation processes.

Experts in the field of zeolite preparation who keep up with the technical literature of the field will be aware of the technique of zeolite crystallization described by X. Wenyang et al. in *Journal of Chemical Communication* Vol. 10, 1990, pp. 755, where ZSM-5 type zeolites of high $SiO_2/Al_2O_3$ molar ratio were obtained through the contact of a precursor gel with vaporized organic compounds. According to this process, the crystallization of the precursor gel (amorphous to X-rays) occurs through the transport of the organic compounds (amines) in the vapor phase. The process thus developed ensures that the synthesis of these kinds of zeolites, which normally is effected using the precursors as an aqueous suspension and in the presence of a template agent, normally a quaternary ammonium salt or amines, is rendered simpler and more economical.

By applying the same technique, other authors effected the synthesis of zeolites of the ZSM family such as ZSM-21 and ZSM-35. Chinese Patent 1,051,334 teaches the preparation of various zeolites of the ZSM family.

M.-H. Kim, H.-X Li, and M. Davis in *Microporous Materials* Vol. 1, 1993, pp. 191–200, also comment on the preparation of ZSM-5 zeolite using the above-cited preparation process. In their work they compare the state-of-the-art technique in an aqueous medium with the new technique, including the use of steam, confirming that such technique can be used successfully for preparing that particular zeolite family.

In spite of the extensive work of Kim et al. exploring a wide range of compositions of the amorphous precursor, where the $SiO_2/Al_2O_3$ molar ratio is varied between 2.5 and 80, the synthesis of type Y zeolite could not be achieved.

One single published work describes how to obtain a faujasite structure zeolite. J. Dong and P. Dong in *Shiyou Huagong* Vol. 24, 1995, pp. 321–324, comment on a type X zeolite of low $SiO_2/Al_2O_3$ molar ratio. This product, however, is not attractive for use in the preparation of catalysts.

In order to make clear why the method proposed by X. Wenyang et al. leads more easily to the ZSM-5 zeolite than to the type Y zeolite, the differences between the two zeolites should be emphasized.

ZSM-5 zeolite, besides using a template agent—generally an ammonium quaternary salt—shows a much higher $SiO_2/Al_2O_3$ molar ratio than the molar ratios usually encountered for type Y zeolites. This causes the excess silica found after the crystallization of the ZSM-5 zeolite to be very low compared to that observed for the synthesis of type Y zeolite. And it is exactly the excess silica—that is, the amount of silica which is not incorporated into the crystalline network of Y zeolite during the crystallization step—that should be controlled during the process of transforming an amorphous solid by the crystallization method, which involves contact with steam or organic compounds.

Another important feature in obtaining new kinds of catalysts and adsorbents is the forming of a type Y zeolite in pre-shaped bodies. A feature of this kind of material is that the surface of the pre-shaped bodies is covered with zeolite crystals. This higher concentration of zeolite in the outer layers of the pre-shaped body favors adsorption and catalysis.

Examples and references on the preparation of faujasite zeolites as pre-shaped bodies are scarce.

M. Matsukata and E. Kikuchi in "Zeolitic Membrane Synthesis, Properties and Prospects," *Bulletin of the Chemical Society of Japan* 70, pp. 2341–2356 (1997) obtained membranes of pentasil-type zeolites with the technique of transferring organic amine vapor onto gels of silica-rich compositions.

U.S. Pat. Nos. 3,657,154, 4,235,753, and 4,493,902 teach the preparation of a type Y faujasite zeolite as pre-shaped microspheres. These patents teach the preparation of type Y zeolites from kaolin microspheres. According to the process, the microspheres are calcined at elevated temperature, leading to meta-kaolin.

After this step, the meta-kaolin microspheres are immersed in an aqueous solution which contains ingredients such as sodium silicate and soda. Next, the suspension of meta-kaolin microspheres is heated to between 80 and 100° C. and agitated slightly to avoid sedimentation and secure the homogenization of the medium to obtain type Y zeolite.

The preparation of type Y zeolite as pre-shaped bodies from kaolin is also the object of U.S. Pat. No. 3,4459,645, which teaches the preparation of type Y zeolite as extrudates. As in the case of microspheres, the calcination of kaolin extrudates to obtain meta-kaolin is a fundamental step in the preparation of type Y zeolite as extrudates.

It is therefore obvious to the experts that the processes taught in the above patents necessarily require the calcination of the pre-shaped kaolin bodies to obtain meta-kaolin, which not only constitutes the raw material of the type Y zeolite but also is of paramount importance for securing the physical integrity of the pre-shaped bodies, which otherwise would collapse through loss of their shape during the step of heating and agitation in the aqueous medium.

In the processes taught in the above cited patents, the zeolite is obtained only when the pre-shaped body is suspended with other raw materials such as sodium silicate and soda. That is why there is a homogenous distribution of the type Y zeolite over the pre-shaped bodies, as presented by J. K. Lampert et al., "Fluid Catalytic cracking catalyst micostructure as determined by a scanning ion microprobe" in *Applied Surface Science*, 55 (1992) 149–158. See especially the Conclusion on page 157.

The preparation of crystalline Y zeolite from a reaction mixture comprising silica and alumina and possibly a "seed" crystal is disclosed in U.S. Pat. No. 5,785,944, but the reaction mixture (precursor gel) requires a silica to alumina ratio (SAR) of from 4–7, preferably 4.5–6.

Advantageously, the preparation of type Y faujasite zeolites as pre-shaped bodies according to the present invention overcomes various drawbacks of the state-of-the-art technique directed to methods of zeolite preparation. Formation of a faujasite zeolite as pre-shaped bodies would avoid modifications of the zeolite properties during the molding processes, besides rendering the overall molding process easier. This is because highly crystalline materials (such as the zeolites), as opposed to amorphous or less crystalline materials which are easily molded, do not offer binding properties and require more complicated techniques and molding methods.

Thus, in spite of the state-of-the-art techniques for applying the method for preparing faujasite zeolites developed by X. Wenyang et al., so far there are no known techniques for preparing a type Y zeolite in high purity and yield as pre-shaped bodies, so as to provide the zeolite and catalyst industry with a novel process for preparing type Y zeolite as well as with novel type Y zeolite-containing products, where the type Y zeolite is prepared by contacting a solid precursor with steam, as is described and claimed in the present invention.

SUMMARY OF THE INVENTION

Broadly speaking, the present invention relates to a process for preparing a type Y faujasite zeolite which comprises the following steps:

preparing a precursor gel having from a source of silica-alumina or a source of silica and a source of alumina and an inorganic template agent or seed, the $SiO_2/Al_2O_3$ ratio being adequate for forming a type Y faujasite zeolite in the sodium form, but in any event, greater than 7;

drying the precursor gel of type Y zeolite, optionally combined with shaping;

recovering the dried precursor gel as a powder or shaped body;

steam treating the dried precursor gel of type Y zeolite with steam under adequate conditions of temperature and time, optionally followed by a washing step;

optional washing of the dried and steamed precursor gel of type Y zeolite with the aid of an aqueous dilute caustic solution to remove any excess silica;

drying the type Y zeolite.

The present invention thus provides a process for preparing a faujasite type Y zeolite in high yield and crystalline purity and makes it possible to prepare the type Y zeolite as pre-shaped bodies as a desired objective.

The present invention also provides a process for preparing a type Y faujasite zeolite from the steam treatment of the precursor gel of type Y zeolite as pre-shaped bodies made up of an inorganic oxide-containing matrix and, optionally, catalytically active metals.

Further, the present invention provides pre-shaped bodies of type Y faujasite zeolite where the outer surface is coated with zeolite crystals from the steam treatment of the type Y precursor gel, thus making the contact of the reagents with the zeolite easier.

DETAILED DESCRIPTION OF THE INVENTION

Figure 1:
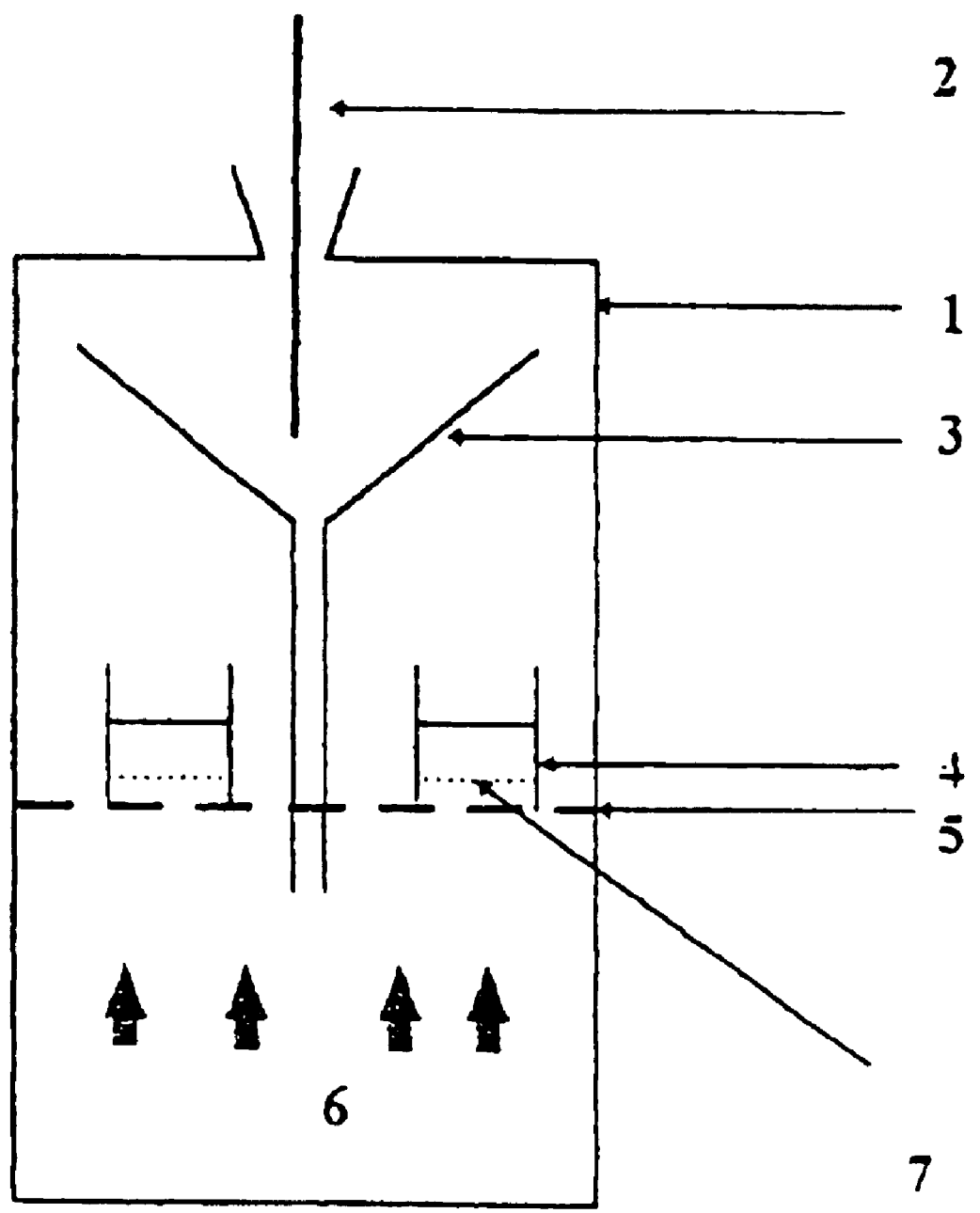
FIG. 1 shows a laboratory scale arrangement for effecting the contact of the precursor gel, as a powder or pre-shaped bodies, with steam.

Broadly speaking, the present invention as described and claimed in the present application relates to a process for preparing zeolites having a Y-type faujasite structure, as well as to pre-shaped bodies of zeolites having a Y-type faujasite structure, the process comprising several steps which will be detailed hereinbelow.

The preparation of zeolite having a Y-type faujasite structure, hereinafter designated as "Y zeolite," starts with the preparation of the precursor gel. According to one of the preferred modes of the present invention, the precursor gel is obtained from the mixture of a source of silica-alumina and an inorganic template, hereinafter designated simply as a seed.

The silica-alumina source can be obtained in several ways, by widely varying the silica-alumina ratio, so long as that ratio exceeds 7. For example, a silica-alumina can be obtained from the co-precipitation of a source of silica, such as sodium silicate, with a source of alumina, such as aluminum sulfate or sodium aluminate, as taught in GB 2166971, yielding an SAR of greater than 7 and up to about 15 and containing of from 10 to 90 weight % $SiO_2$, or according to EP 0129766, which shows a silica-alumina ratio of 10. The precursor gel can also be prepared from a silica source, an alumina source, and a seed, yielding a silica-alumina gel in situ. Suitable alumina sources are aluminum salts such as aluminum sulfate, sodium aluminate, aluminum nitrate, aluminum chlorohydrate, aluminum trihydrate such as gibbsite, BOC, and bayerite, calcined forms of aluminum trihydrate including flash calcined gibbsite. Also mixtures of the above-mentioned alumina sources may be used. If aluminum trihydrate or its thermally treated forms are used, it is preferred to age the silica source and alumina source in a slurry at a temperature below 100° C. to obtain the precursor gel. Suitable silica sources include sodium silicate and silica sol, for instance ammonium stabilized silica sol.

If desired, organic or inorganic acids and bases, for example for control of the pH, may be added to ensure the formation of precursor gel.

The inorganic template or seed can be prepared according to several recipes to be found in the literature. Kasahara et al. in "Studies of Surface Science and Catalysis," *Proceedings of the 7th International Conference on Zeolites* 1986, pp. 185–192, teach the preparation of a seed having the following molar composition:

$Na_2O/Al_2O_3$ (NAR): 15, $SiO_2/Al_2O_3$ (SAR): 10, $H_2O/Al_2O_3$: 187

Equally useful seeds having different molar compositions can be obtained as taught in the patents:

U.S. Pat. No. 3,808,326: NAR:16, SAR: 15, HAR: 319;
U.S. Pat. No. 4,166,099: NAR:15, SAR: 14, HAR: 320; or
DE 3538416: NAR:12, SAR:15, HAR: 240

Such recipes lead to the preparation of seeds showing successful results for the preparation of Y zeolite, and therefore should be equally useful in the preparation of the Y zeolite as described in the present application.

According to another embodiment of the present invention, the Y zeolite precursor gel is prepared by mixing the source of silica-alumina or the sources of silica and alumina and the seed at ambient temperature.

The amount of seed required for the crystallization of the Y zeolite is between about 0.2 and about 12 weight %, more preferably between about 1 and about 5 weight %.

After the mixture, the $SiO_2/Al_2O_3$ molar ratio is from greater than 7 to about 12, more preferably from greater than 7 to about 10.4. After the required period of time for homogenization, the suspension is filtered and dried. The ignition loss of the dried filter cake is lower than 10%, based on the initial weight of the filter cake. The ignition loss is determined by the difference in weight of the sample before and after the calcination of a portion of the sample in an oven at 815° C. for one hour.

We have surprisingly found that in our process an SAR greater than 7 in the precursor gel will produce superior results than when 7 or less is employed. An SAR of 7 or less frequently results in less pure and hence lower yields of Y zeolite or a lower degree of crystallinity. Another advantage that can be cited for the use of an SAR higher than 7 in the precursor gel is that a higher SAR zeolite product may be synthesized. A further advantage is that the presence of excess silica could be employed to serve as a binder in a shaped body comprising the Y zeolite and to otherwise improve the physical properties of the shaped body, such as pore structure, when silica is partly removed by chemical methods.

The drying step may optionally be combined with a shaping step. Suitable shaping steps include spray-drying, pelletizing, extrusion (optionally combined with kneading), beading, or any other conventional shaping method used in the chemical or petroleum industry. The amount of liquid present in the precursor gel used in the shaping step should be adapted to the specific shaping step to be conducted. In other words, the degree of drying prior to the shaping step must be adjusted. It may even be necessary to add additional or other liquid and/or to change the pH to make the precursor gel suitable for shaping. For instance, processes for preparing membranes generally use an aqueous suspension of the zeolite Y precursor gel. Also for spray-drying it is crucial that the solids content is properly adjusted. Some shaping methods inherently include drying of the shaped bodies, e.g. spray-drying. Other shaping methods need additional drying of the formed bodies. Various additives which are commonly used in the various shaping methods, such as pelletizing aids and extrusion aids, may be added to the precursor gel. If the precursor gel is dried without any shaping step, it is obtained as a powder. These pre-shaped bodies or powders are subsequently subjected to the treatment with steam which will be described hereinbelow.

The device shown in FIG. 1 was employed to effect the treatment with steam on laboratory scale. To a glass vessel (1) was attached a porous perforated plate (5) to be used as a support for the crucible (4), which has a bottom (7) made of sintered glass. In it the precursor sample to be treated with steam is to be placed, the steam being generated in situ from the vaporization of the water (6) present in the bottom of vessel (1); a funnel (3) is employed to avoid droplets of condensed water dropping directly onto the sample subjected to the treatment with steam; a thermometer (2) is also used to monitor the process.

Figure 2:
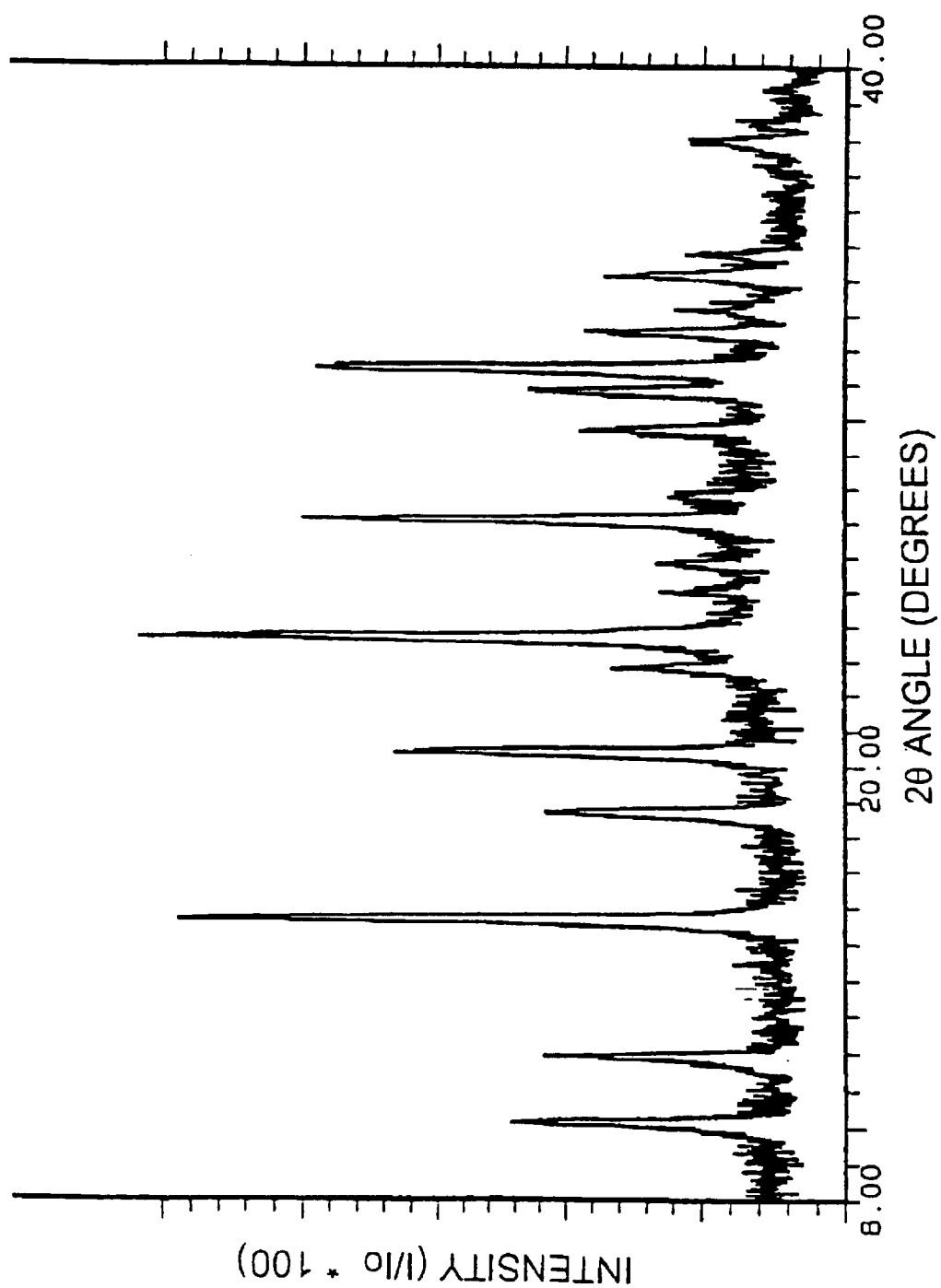
FIG. 2 illustrates a typical X-ray diffractogram (XRD) of a type Y faujasite zeolite as prepared according to the present invention.

The precursor sample, either as a powder or as a pre-shaped body, is placed in the crucible (4) having a bottom (7) of sintered glass and exposed to steam during a period of time between about 16 and about 80 hours, more preferably between about 48 and about 72 hours. After being exposed to steam the resulting product is dried in an oven through which air is circulated, at 120–130° C., for about 16 to about 18 hours. FIG. 2 attached illustrates the X-ray diffractogram of the dried product, which is a Y zeolite obtained according to the principles of the present invention. Comparison with FIG. 3, which is an X-ray pattern of a Y zeolite of the prior art, shows that FIG. 2 depicts one single crystalline phase having the X-ray pattern of a Y zeolite according to prior art.

One of the features of the process described and claimed in the present invention is the presence of amorphous silica which is not used for forming the Y zeolite during the steam treatment. Although in some instances, such as the formation of thin pellets or membranes, it would be desirable for the unreacted silica to act as a binder in order to impart higher mechanical strength to the thin pellet or membrane, in other instances the presence of unreacted silica may jeopardize the textural properties of the Y zeolite, therefore the removal (by washing off) of such unreacted silica is advisable.

Unreacted silica can easily be removed by washing with water or, more preferably, with an aqueous dilute caustic solution. Particularly useful are solutions of alkaline hydroxides such as sodium or potassium. The concentration of the solution of alkaline metal hydroxides may vary between about 0.1 and about 1N, more preferably between about 0.5 and about 1 N. The temperature of the caustic wash is also an important parameter and may vary between 20 and 90° C., more preferably between 65 and 80° C. The period of time during which washing is effected is strongly influenced by the temperature and may vary between about 30 and about 150 minutes, more preferably, it is about 60 minutes. The choice of the concentration of the solution of alkaline metal hydroxides and of the washing temperature is a function of the amount of amorphous silica to be removed. Such removal is indicated by the weight loss of the sample and by the increase in surface area and the volume of micropores plugged by the amorphous silica.

As described above, one of the great advantages of the process for preparing Y zeolite as described and claimed in the present invention is that such a process enables the conversion of the precursor gel into Y zeolite in pre-shaped bodies having varying formats.

According to a preferred embodiment of the present invention, Y zeolite is obtained as a membrane from the deposition of the precursor gel on a body which is pre-shaped as a membrane.

The precursor gel-containing membranes can be prepared according to any well-known technique usually employed for preparing membranes. For example, C. J. Brinker and G. W. Scherer in *Sol-Gel Science: Physics and Chemistry of Sol-Gel Processing*, chapter 13, Academic Press, 1996, teach the preparation of membranes by coating several pre-shaped bodies with solutions or suspensions which constitute precursors of the active phase of the membrane.

To effect such coating, conventional methods such as dip coating and spin coating are used. In the dip coating method, a pre-shaped body is dipped in the solution or suspension which contains the active phase and then subjected to the steps of drying and activation. In the spin coating method, a pre-shaped body is covered with a coating of the solution or suspension which contains the active phase and then subjected to rotating movements in order to withdraw the excess solution or suspension, so that only a thin layer of active phase is left on the surface of the pre-shaped body, which is then subjected to the drying and activation steps.

Both techniques are useful for preparing membranes from the Y zeolite precursor gel. The thus prepared membranes are subjected to the treatment with steam as described and claimed in the present invention, and may optionally be impregnated with catalytically active metals, such as platinum, in amounts varying from about 0.1 to about 10 weight %.

According to another embodiment of the present invention, Y zeolite as pre-shaped bodies may be obtained as pellets or extrudates by employing state-of-the-art techniques for molding and formatting, as is well-known to the experts.

Pellets or extrudates can be prepared so as to obtain the precursor gel added to an inorganic matrix such as silica, alumina, silica-alumina, kaolin, zirconia or mixtures of these constituents, as is usual in the preparation of catalysts or adsorbents. This way, pellets or extrudates having different contents of Y zeolite precursor embodied in the inorganic matrix can be obtained, which are then subjected to the steam treatment as described and claimed in the present invention, without loss of the initial format.

The main feature of the pellets and extrudates prepared according to the present invention is that the pellet or extrudate surface is covered with Y zeolite crystals in a distinct way from that normally encountered when pellets or extrudates are prepared according to state-of-the-art techniques, the standard techniques leading to a uniform distribution of the zeolite over the pre-shaped body.

Optionally, the pellets or extrudates prepared according to the described and claimed process of the present invention may be impregnated with catalytically active metals, the resulting products leading to various catalyst types for use in the oil and petrochemical industries.

For example, hydrotreating catalysts usually show such metals as nickel, cobalt, molybdenum, and tungsten in their composition in contents of from 10 to 30 weight %, depending on the hydrotreating process used.

According to another embodiment of the present invention, the precursor gel may be embodied in the matrix of a fluid catalytic cracking catalyst and spray-dried, yielding the microspheres usually employed in fluid catalytic cracking units (FCCU). Generally, the matrix of the cracking catalyst is made up of kaolin, alumina or silica-alumina, and a zeolite, usually of the Y type.

After the preparation of the microspheres, the type Y zeolite may optionally be subjected to an ionic exchange process with rare earth metal-containing compounds such as rare earth metal salts and oxides, as is well-known to the experts; usually, the Y zeolite can be exchanged with of from 2 to 10 weight % rare earth oxides. Further, the type Y zeolite can be ion exchanged with an ammonium salt.

Advantageously, according to the process of the present invention, when subjected to the treatment with steam, the microspheres which contain the precursor gel embodied in the cracking catalyst matrix will favour the formation of the Y zeolite, more preferably on the surface of the microsphere, this being extremely interesting for certain fluid catalytic cracking operations. When the FCC unit operates according to the mode known as "low contact time" for example, the most efficient catalyst will be the one which has the active portion of the catalyst—that is, the Y zeolite—most exposed and nearest to the surface of the catalyst microspheres. This will enable the catalyst to establish a quicker contact with the feed being cracked, which ultimately will promote the cracking reactions, undesirable overcracking reactions being thus minimized.

The Y zeolite and the pre-shaped bodies prepared as described and claimed herein were characterized with the aid of several commonly employed physico-chemical techniques well-known to the experts, such as:

X ray diffraction (XRD): one of the most widely employed techniques for characterizing zeolites. The instrument used was a Phillips PW 1710, with Cu K α radiation and a graphite monochromator. For the Y zeolite samples (without any other crystalline phase such as kaolin) all the 2θ peaks between 9 and 35° were considered and integrated for calculating the crystalline percentage of the Y zeolite. A Y zeolite prepared according to well-known techniques was taken as a 100% crystallinity standard.

Whenever the samples presented excess amorphous unreacted silica, the percentage of calculated crystallinity was adopted (% Y calculated), which refers to the Y zeolite content obtained from the following relationship:

$$\% \text{ Y calculated} = [SAR_{gel}/SAR_{IV}] * \% \text{ Y}_{max}$$

Since the maximum observed crystallinity (% Y max) through X ray diffraction is reduced as a result of mass dilution by the unconverted silica. Thus, by correcting the silica dilution:

$$\% \text{ Y}_{max} = [SAR \text{ of the zeolite}/SAR_{gel}] * \% \text{ Y calc.}$$

and SAR of the zeolite=$SAR_{IV}$;

therefore $$\% \text{ Y calculated} = [SAR_{gel}/SAR_{IV}] \% \text{ Y}_{max}.$$

For kaolin-containing samples, as in the case of the microspheres, the sum of the peak areas which correspond to the 220, 331, 620, 533, 642, 733, 751, and 822 reflections was compared to the sum of the areas of the same peaks for the Y zeolite standard, the interference of the kaolin peaks being eliminated.

elemental analyses: sodium, aluminum, and silicon were analyzed with the aid of X-ray fluorescence (XRF), the obtained values being reported as oxides.

silica-alumina ratio (SAR): depending on the sample tested, the value of this parameter can be obtained by two methods. For samples which were washed to eliminate the unreacted silica, elemental analysis through X-ray fluorescence (XRF) was used.

For unwashed samples, the silica-alumina ratio was obtained with the aid of infrared spectroscopy ($SAR_{IV}$).

$SAR_{IV}$ is obtained from the analysis of the wave number (λ) of the peak corresponding to the vibration of symmetrical stretching of the O-T-O link (where O are oxygen atoms and T are Si or Al atoms). This number is correlated with the number of Al atoms per unit cell of the crystalline network and is observed in the region of vibration of the crystal, between 1400 and 400 cm$^{-1}$, according to J. R. Sohn et al. in Zeolites 6, pp. 255–57, 1986.

surface area: this was assessed through the BET method (Brunauer, Emmett, and Teller), a widely known and applied method for determining surface areas in porous materials. The method is based on analysis of the nitrogen adsorption isotherms at the temperature of liquid nitrogen. The volume of micropores is also obtained from the adsorption isotherm, based on the "t-plot" method (of Harkins & Jura) in the range of 3.3 to 5.4 Angstrons. In spite of some discussion still remaining on the validity of using this method for microporous solids such as zeolites, such a method is widely employed and the obtained values are normally accepted by the experts in the field.

scanning electron microscopy (SEM): this is a technique used for analyzing the morphology and composition of the catalyst surface. Samples were mounted on a double-sided adhesive carbon tape followed by a layer of electrical conducting material (Au-Pd).

average diameter of the catalyst microspheres: this parameter corresponds to the diameter, expressed in microns, below which there are 50% of the catalyst particles. It is assessed through the light scattering laser technique from an aqueous suspension of a catalyst sample.

evaluation of the catalytic activity of the catalyst microspheres: in the field of fluid catalytic cracking, the evaluation of the zeolite catalyst performance is usually effected on a laboratory scale with the aid of the microactivity test—MAT—in accordance with the ATM D-3907-80 Method, as adapted to heavy feeds. The MAT test comprises a fixed bed reactor containing the catalyst sample to be tested, into which a known amount of gas oil is injected. Different catalyst/oil ratios are tested in order to obtain yield curves which allow the quantification of products for the same conversion level. The temperature of the MAT test was altered from 482° C. to 520° C. in order to allow the flow of a heavier feed. The conversion, accepted as the catalyst activity, is defined as the weight percentage of the feed converted into coke, gas, and gasoline. As the light cycle oil (LCO) fraction is not considered a product, the conversion is expressed as [100–(LCO+Residuum)].

The present invention will now be illustrated by the following examples, which should not be construed as limiting the same.

COMPARATIVE EXAMPLE 1

This Example illustrates a state-of-the-art technique method for preparing a Y-type zeolite.

1800 g of an amorphous silica-alumina suspension obtained by co-precipitation of sodium silicate and aluminum sulfate, of molar composition [SAR:NAR:HAR]=[9.38:0.93:130], were used as a source of silica-alumina.

A seed of molar composition [SAR:NAR:HAR]=[9.38:15:183] was prepared by adding 94.17 g of sodium hydroxide pellets and 54.8 g of water to 252 g of the suspension of amorphous silica-alumina and aged at 30° C. for 3 hours. After the aging period, the seed was admixed with the remaining amorphous silica-alumina suspension, so as to form a reaction mixture having molar the composition [SAR:NAR:HAR]=[9.44:3.1:135–335]. The freshly prepared reaction mixture was introduced into a tight polyethylene vessel, which was placed in a boiling water bath during a period of time which varies as a function of the HAR of the mixture. For a high HAR such as 335, the complete crystallization of the mixture into a Y zeolite requires 24 hours. For a reaction mixture of molar composition [SAR:NAR:HAR]=[9.4:3.1:135] the complete crystallization is reached in 15 hours.

The characterization of the Y zeolite is usually effected by X-ray diffraction of the sample dried in an oven at 120° C. for 16 to 18 hours.

Figure 3:
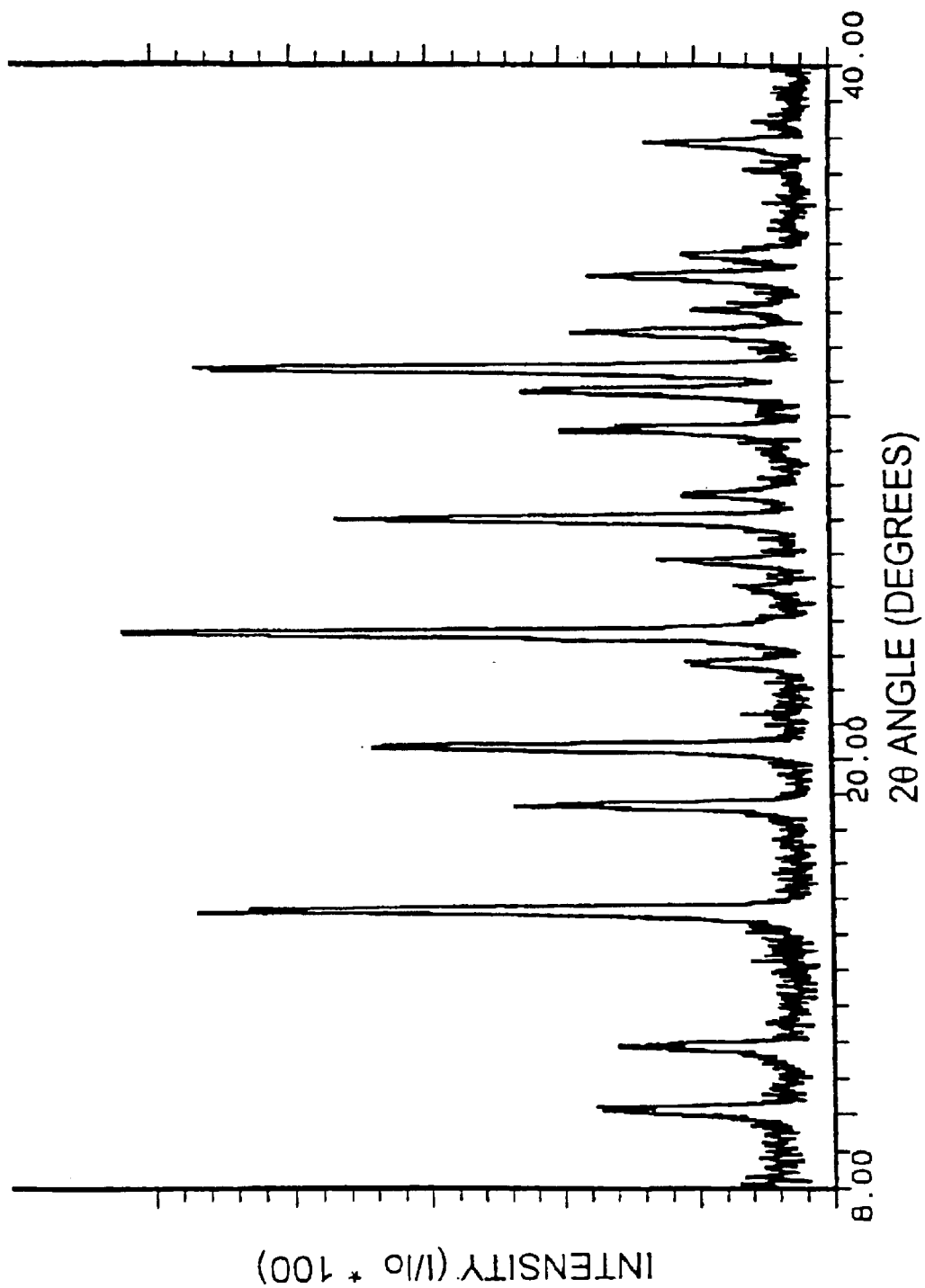
FIG. 3 illustrates a typical X-ray diffractogram (XRD) of a type Y faujasite zeolite as prepared according to the state-of-the-art technique.

FIG. 3 illustrates the typical diffractogram of the Y zeolite obtained through the above state-of-the-art method of preparation.

EXAMPLE 1—TYPE Y ZEOLITE AS A POWDER

This example illustrates one of the preferred modes of the present invention, namely, the preparation of the Y zeolite as a powder from the steam treatment of precursor gels having various $SiO_2/Al_2O_3$ ratios and various amounts of seed.

In a glass beaker and under moderate agitation, 35.8 g of seed prepared according to DE 3538416 were added to a suspension of 241 g of silica-alumina gel, prepared as in Comparative Example 1.
The composition of the resulting mixture was:

$$[SiO_2:Al_2O_3:Na_2O:H_2O]=[7.67:1:1.93:67.1]$$

After 30 minutes of homogenization, the suspension was transferred to a ceramic plate and allowed to dry, first in air and then in an oven at 120° C. during 16 to 18 hours. After oven drying, the ignition loss of the product was lower than 10% by weight.

The dried product was placed in crucible (4) having a sintered bottom (7) as shown in FIG. 1, and subjected to the steam treatment at 100° C. for 16 to 72 hours.

After the steam treatment, the sample was dried in an oven provided with air circulation at 120° C. for 16 to 18 hours. The dried sample was subjected to characterization by X-ray diffraction.

TABLE 1 below shows the results of several experiments in which the SAR of the precursor gel, the seed content, and the steam treatment time were varied.

crystallinity percentage was expressed as % Y calculated (% Y calc.). The Y higher than 100% values indicate that the crystallinity of the tested sample was higher than that of the standard.

Only the peaks corresponding to the characteristic crystalline phase of the Y zeolite were observed in the X-ray diffractogram, as may be seen in FIG. 2, which is evidence of the efficiency of the process of the present invention directed to the preparation of Y-type zeolites.

It can be seen from data in Table 1 that for all values of SAR of the precursor gel and varied combinations of seed contents, zeolite Y alone was obtained, without the presence of impurities, this being evidence of the outstanding selectivity of the present process.

EXAMPLE 2

This Example illustrates another preferred embodiment of the present invention, when the amorphous, unreacted silica is withdrawn by washing with an aqueous alkaline solution, for example a sodium hydroxide solution.

TABLE 2 illustrates a few examples of type Y zeolites which result from the steam treatment of precursor gels prepared according to Example 1. The zeolites were dried in an oven for 120° C. for 18 hours, then washed with a sodium hydroxide solution for 1 hour. Sample F is a control sample which has not been washed.

TABLE 1

| Reaction mixture | | Drying pre-treat-ment | Composition of the precursor gel | | Crystallinity as a function of the treatment | | | Characterization of the resulting NaY | |
|---|---|---|---|---|---|---|---|---|---|
| SAR gel | seed % | ° C./h | SAR gel | NAR gel | 21 h | time (% Y) 48 h | 72 h | $SAR_{IV}$ | % Y calc. |
| 5.3 | 6 | 120/16 | 6.07 | 1.59 | 80 | — | — | 5.57 | 88 |
| 5.3 | 6 | 120/16 | 5.68 | 1.34 | 81 | — | — | 5.64 | 81 |
| 7.3 | 0.2 | 120/3 | 7.70 | 1.78 | 5 | 46 | — | — | — |
| 7.3 | 4 | 120/16 | 7.67 | 1.93 | 42 | 50 | 84 | 5.55 | 116 |
| 7.3 | 4 | 120/3 | 7.67 | 2.13 | 59 | 68 | 81 | 5.53 | 112 |
| 7.5 | 12 | 25/24 | 7.63 | 1.93 | 34 | 83 | 90 | 6.20 | 111 |
| 9.4 | 16 | 120/16 | 10.4 | 2.94 | 10 | — | 46 | 5.46 | 88 |

Table 1 above shows the results for different samples prepared from varying amounts of seed, SAR, and drying periods or steam treatment periods of the precursor gel. In all cases the Y zeolite was characterized as the sole crystalline phase under X-ray analysis, without showing any foreign zeolites impurities such as the P, B or S phases normally encountered in preparations of the state-of-the-art technique using the aqueous phase. Data labeled (—) in Table 1 should not be construed to mean that no Y zeolite was obtained, only that the experiment was not continued or that no samples were taken for analysis.

The SAR molar ratio $SiO_2/Al_2O_3$ in the resulting zeolite in its sodium form, NaY, shows that the precursor gel was properly directed to values of greater than 7. So long as an appropriate amount of inorganic template agent is employed, an SAR in the precursor gel of greater than 7 will result in superior yield of Y zeolite at very high crystallinity.

The resulting Y zeolite was not washed to eliminate the unreacted silica. That is why the molar ratio of the Y zeolite was determined by infrared spectroscopy ($SAR_{IV}$) and the

TABLE 2

| Sample | % Y - before washing (XRD) | % Y after washing (XRD) | SAR (FRX) | BET Surface (m²/g) | Volume of micropores (ml/g) |
|---|---|---|---|---|---|
| A | 85 | 106 | — | 644 | 0.280 |
| B | 84 | 94 | — | 613 | 0.265 |
| C | 90 | 118 | — | 657 | 0.270 |
| D | 81 | 109 | 4.90 | 706 | 0.297 |
| E | 63 | 106 | 4.85 | 707 | 0.306 |
| F | 51 | — | 7.21 | 183 | 0.080 |

TABLE 2 shows several results that will now be explained in more detail.

The $SiO_2/Al_2O_3$ ratio is obtained through elemental analysis using X-ray fluorescence (XRF). Although this is a common method for determining the $SiO_2/Al_2O_3$ ratio in zeolites, it should be carefully interpreted since the value which is obtained is the molar ratio, that is, it does not vary even if there is any amorphous portion to the X-ray. This is in contradiction to the results obtained for $SiO_2/Al_2O_3$ through infrared spectroscopy. In the case of the results of TABLE 2, the value of the $SiO_2/Al_2O_3$ molar ratio obtained by X-ray fluorescence can be accepted, since the product has been washed with a sodium hydroxide solution and the amorphous silica removed. For sample F it can be seen that the value of the $SiO_2/Al_2O_3$ ratio is very high due to the presence of amorphous silica which has not been removed.

The results of TABLE 2 show that, after washing with sodium hydroxide solution and the ensuing removal of amorphous silica, there was a significant improvement in the textural properties (surface area and volume of micropores) of the Y zeolites samples obtained through the process of the invention.

Figure 4:
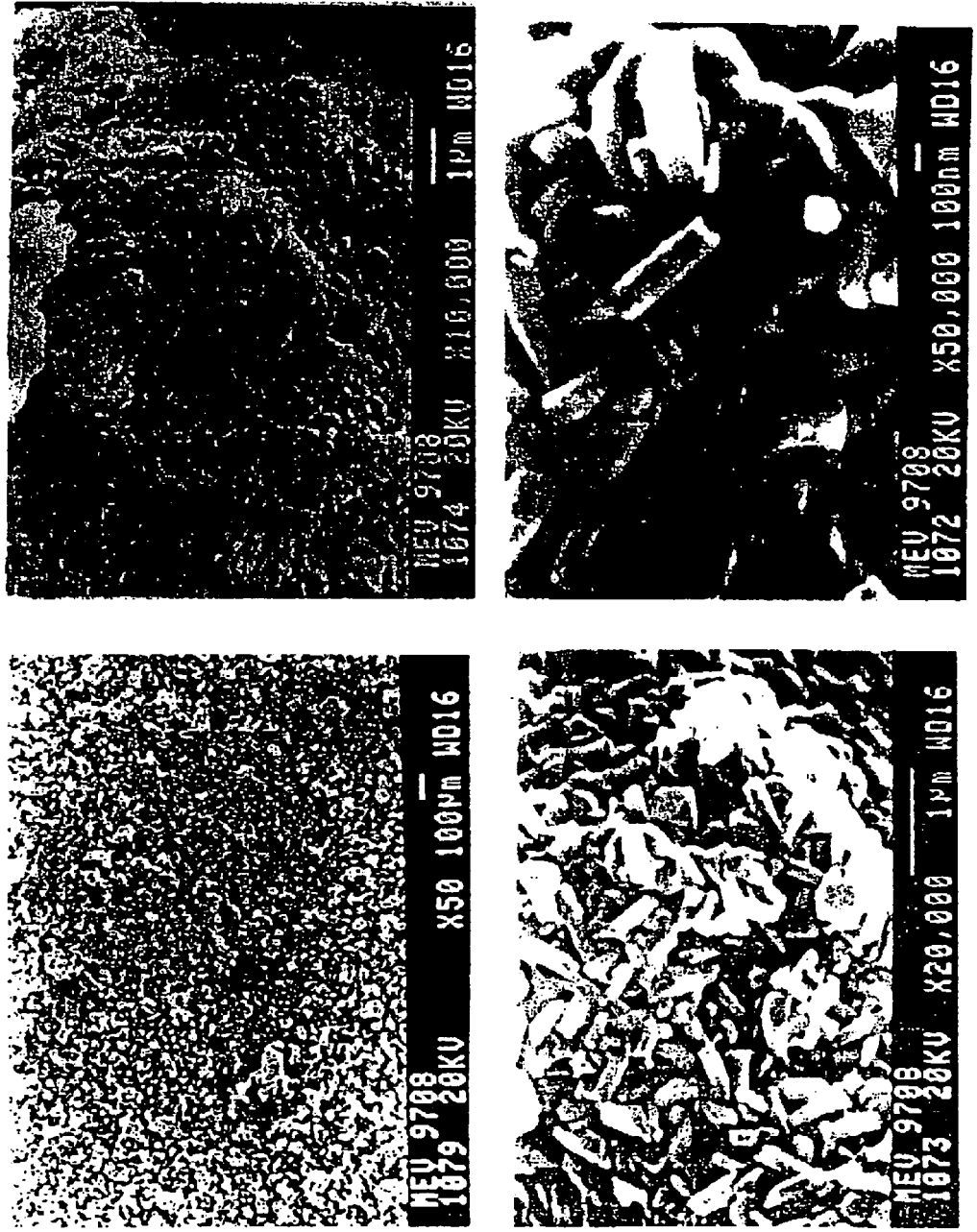
FIG. 4 illustrates the scanning electronic microscopy (SEM) of sample D of Table 2, at different magnifications (50, 10,000, 20,000, and 50,000 times.)

FIG. 4 shows the scanning electronic microscopy (SEM) of sample D in TABLE 2, with different magnifications, the crystals of Y zeolite prepared from the precursor gel subjected to the steam treatment and washed with soda for the removal of amorphous silica being clearly observed.

EXAMPLE 3—TYPE Y ZEOLITE ON A PRE-MOLDED PELLET

This Example illustrates the preparation of a Y zeolite in a body which is pre-shaped as a pellet.

One of the advantages of the process of the present invention is the possibility of forming the Y zeolite on a pre-shaped solid precursor gel. As the precursor gel is not in the presence of an aqueous phase, no mass of precursor will be transported through the mechanisms of dissolution and re-precipitation which are common in the process of crystallization of zeolites when obtained as an aqueous suspension. This way, the deformation of the geometric shape of the pre-shaped body can be prevented.

TABLE 3 lists the results for the formation of Y zeolite in pre-shaped bodies as pellets. The solid precursors—silica-alumina gel and seed—showed the following compositions:

G samples: $[SiO_2:Al_2O_3:Na_2O]=[7.67:1:2.13]$
H sample: $[SiO_2:Al_2O_3:Na_2O]=[7.67:1:1.93]$ A pellet of 270 mm in diameter and 3 mm in thickness was prepared from 2 g of powdered precursor gel in a hydraulic press. In order to determine the deleterious effects, if any, in the crystallization of the Y zeolite, the pressure applied in the formation of the pellet was varied. The treatment time with steam was also varied.

TABLE 3

| Sample | Pressure applied in forming the pellet (Ton/cm²) | Treatment time with steam (hours) | % Y (XRD) |
|---|---|---|---|
| H | powder | 24 | 46 |
|  | 0.283 | 21 | 47 |
| G/1 | powder | 21 | 63 |
|  | 0.283 | 21 | 69 |
|  | 0.283 | 48 | 68 |
| G/2 | 0.283 | 21 | 68 |

The data from TABLE 3 indicates that the pressure employed for molding or formatting the pellet did not affect the crystallization of the Y zeolite; on the contrary, the pre-molded pellets showed a better response to the crystallization process of the Y zeolite using the steam treatment than the corresponding powder. This data indicates that pre-forming the solid precursor of the Y zeolite does not create any problems for the crystallization process of the zeolite.

EXAMPLE 4—TYPE Y ZEOLITE ON A PRE-MOLDED EXTRUDATE

This Example illustrates a preferred mode of the invention which deals with the preparation of a Y zeolite which is pre-molded as an extrudate. 90 g of Y zeolite precursor gel (silica-alumina gel and seed, as described in detail in Example 1) were admixed with 24 g of a boehmite type alumina and 70 g of acetic acid 4% weight/weight.

The resulting paste was extruded in an extruder having a cylindrical matrix of 2 mm external diameter, and continuous threads of the extruded precursor were formed which were then cut manually to generate extrudates of around 2 mm in diameter and of from 4 to 5 mm in length, which were then dried in an oven at 120° C. for 18 hours. The dried extrudates that contained the Y zeolite precursor gel were calcined at 400° C. for 2 hours to remove the organic residue. After cooling at ambient temperature, the calcined extrudates were subjected to the steam treatment as described hereinbefore for a period of 72 hours.

After the steam treatment, the extrudate samples were dried and analyzed with the aid of X-ray diffraction, which showed 44% of the crystalline phase having the type Y zeolite structure prepared in situ on the extrudate which contained the precursor gel, without loss of the geometric features of the extrudate.

An alternative formulation for the preparation of extrudates which contain the precursor gel was prepared using 200 g of the precursor gel as described in detail in Example 1, 100 g of boehmite alumina, 70 g of acetic acid 4% weight/weight, and 10 g of microcrystalline cellulose.

The extrusion of the above paste resulted in continuous threads of 2 mm in diameter which were cut manually to provide extrudates of from 4 to 5 mm in length, which were then dried in an oven at 120° C. for 18 hours.

The dried extrudates were calcined at 400° C. to remove the organic residue (acetic acid and cellulose), and then subjected to the steam treatment of the present invention for a period of 72 hours.

After the steam treatment, the extruded samples were dried and analyzed with the aid of X-ray diffraction, showing 38% of the crystalline phase having the structure of type Y zeolite and traces of aluminum hydroxide of the boehmite kind from the alumina used in the formulation. A type Y zeolite was prepared in situ on the precursor gel-containing extrudate, without any loss of the geometric features of the extrudate and without the presence of different zeolite crystalline phases, this being evidence of the efficiency of the process described and claimed in the present invention.

EXAMPLE 5—TYPE Y ZEOLITE ON A MICROSPHERE PRE-SHAPED BODY

This example illustrates another preferred mode of the present invention, namely, the preparation of the Y zeolite as pre-formatted microspheres, aimed at obtaining catalysts for fluid catalytic cracking.

A precursor gel (silica-alumina gel and seed, as detailed in Example 1) was admixed with an amount of kaolin and, optionally, sodium silicate to obtain a suspension having a solids content which rendered it adequate for the spray-drying process.

The equipment used for spray-drying was an industrial spray-drier where the temperature of the drying gases was between 440–450° C. at the inlet and between 115–130° C. at the outlet, the flow rate of the feed being 4 kg/min, and the atomizer rotation 13,500 rpm. During the atomization process drying of the particles is extremely quick, resulting in microspherical particles of the catalyst precursor having diameters of the order of 20–100 microns.

An important parameter for the spray-drying operation is the solids content of the suspension to be dried. If required, the concentration of the solids content may be adjusted by adding water. Normally, the solids content of the catalyst suspensions to be dried in the spray-drying process should be between about 15 and about 25 weight % solids, preferably about 20 weight %. Such concentrations are based on practical reasons: an excessively low concentration will result in microspheres of a granulometry which is too fine for the desired end use in the fluid catalytic cracking units. On the other hand, an excessively high concentration will result in high-viscosity problems which render the process of transport and spray-drying more difficult.

TABLE 4 lists the results obtained for various preparations where the kaolin and sodium silicate contents were varied.

TABLE 4

| Sample | Kaolin content k | Silicate content s | Y % in sample 48 h | 72 h | Y %, less the inert portion 48 h | 72 h |
|---|---|---|---|---|---|---|
| I | + | + | 12 | 16 | 27 | 35 |
| J | − | + | 29 | 38 | 39 | 50 |
| L | + | − | 0 | 10 | 0 | 22 |
| M | − | − | 37 | 52 | 49 | 69 |

The data of TABLE 4 will now be explained in more detail.

Two levels of kaolin and sodium silicate were employed in the preparation of the catalyst samples. For kaolin (k), the high level (+) corresponds to 55 weight % kaolin in the final catalyst composition. The low level (−) corresponds to 25 weight % kaolin.

For sodium silicate, the high level (+) was 10 weight % sodium silicate, based on the silica in the reaction mixture, while the low level (−) was zero. The 100 weight % is balanced with the precursor gel. The samples prepared from the precursor gel (silica-alumina gel and seed), kaolin, and sodium silicate were spray-dried, resulting in microspheres of 45–65 microns granulometry. The steam treatment was effected during two different periods (48 and 72 hours) in a device similar to that illustrated in FIG. 1 attached to the specification.

After the steam treatment the microspheres were washed with a sodium hydroxide solution 1N at 80° C. for 90 minutes, as described in Example 2, to remove the amorphous silica. Then the microspheres were dried in an oven at 120° C. for 12 to 16 hours to be subjected to characterization tests.

Data from TABLE 4 leads to the conclusion that even in the presence of high levels of kaolin and sodium silicate the Y zeolite was crystallized as the only crystalline phase. However, the levels of precursor gel, kaolin, and sodium silicate in the catalyst should be adjusted according to the desired composition for the cracking catalyst, that is, the data presented here is not limiting with respect to the precursor gel, kaolin or sodium silicate contents potentially useful in the preparation of catalysts for the catalytic cracking units.

Figure 5:
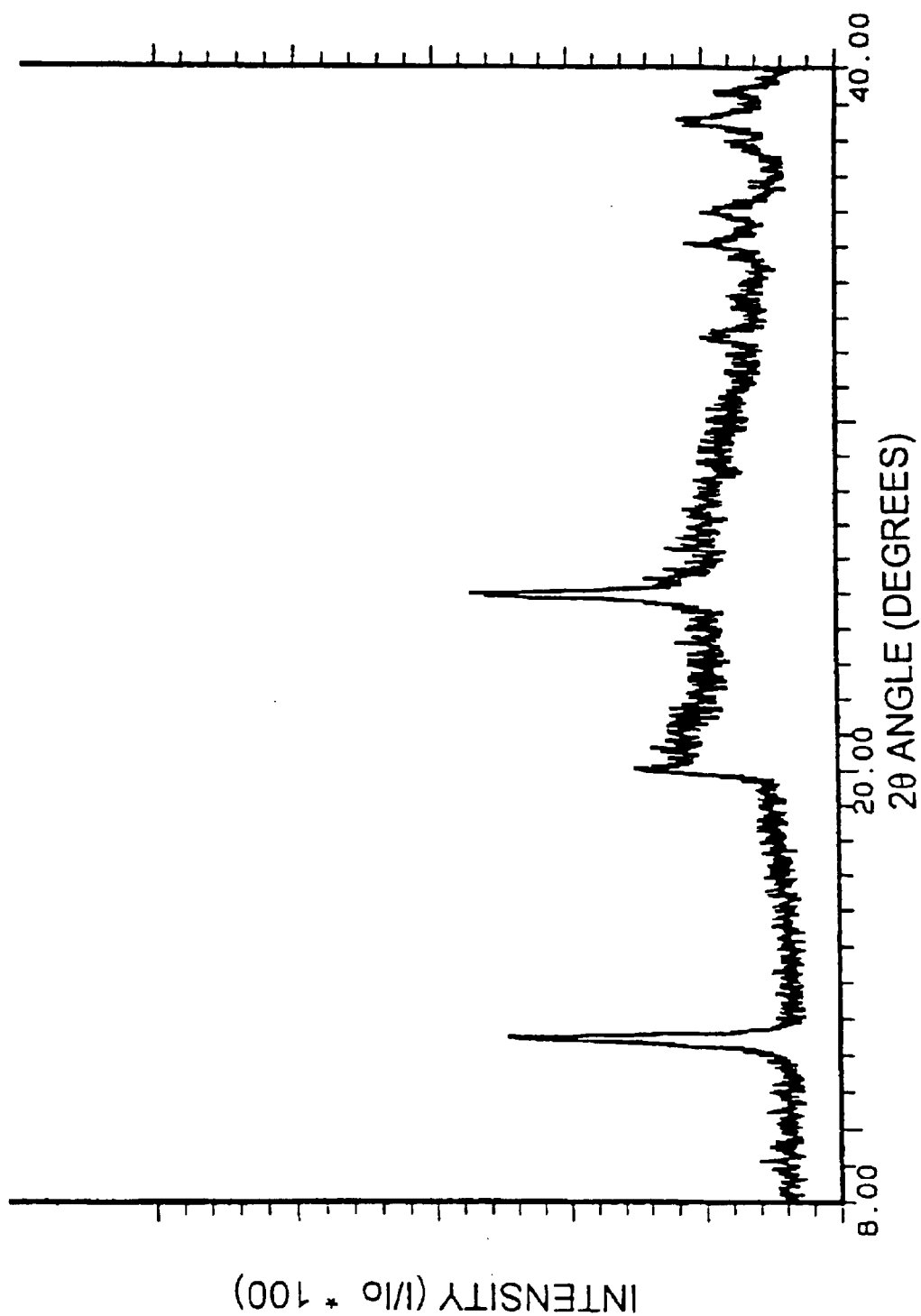
FIG. 5 illustrates the X-ray diffractogram (XRD) of the microspheres which contain the precursor gel and kaolin, before the steam treatment.

FIG. 5 illustrates the X-ray diffractogram of the catalyst microspheres before the steam treatment, indicating only the crystalline phase corresponding to kaolin, since the precursor gel and the seed are amorphous to the X-ray.

Figure 6:
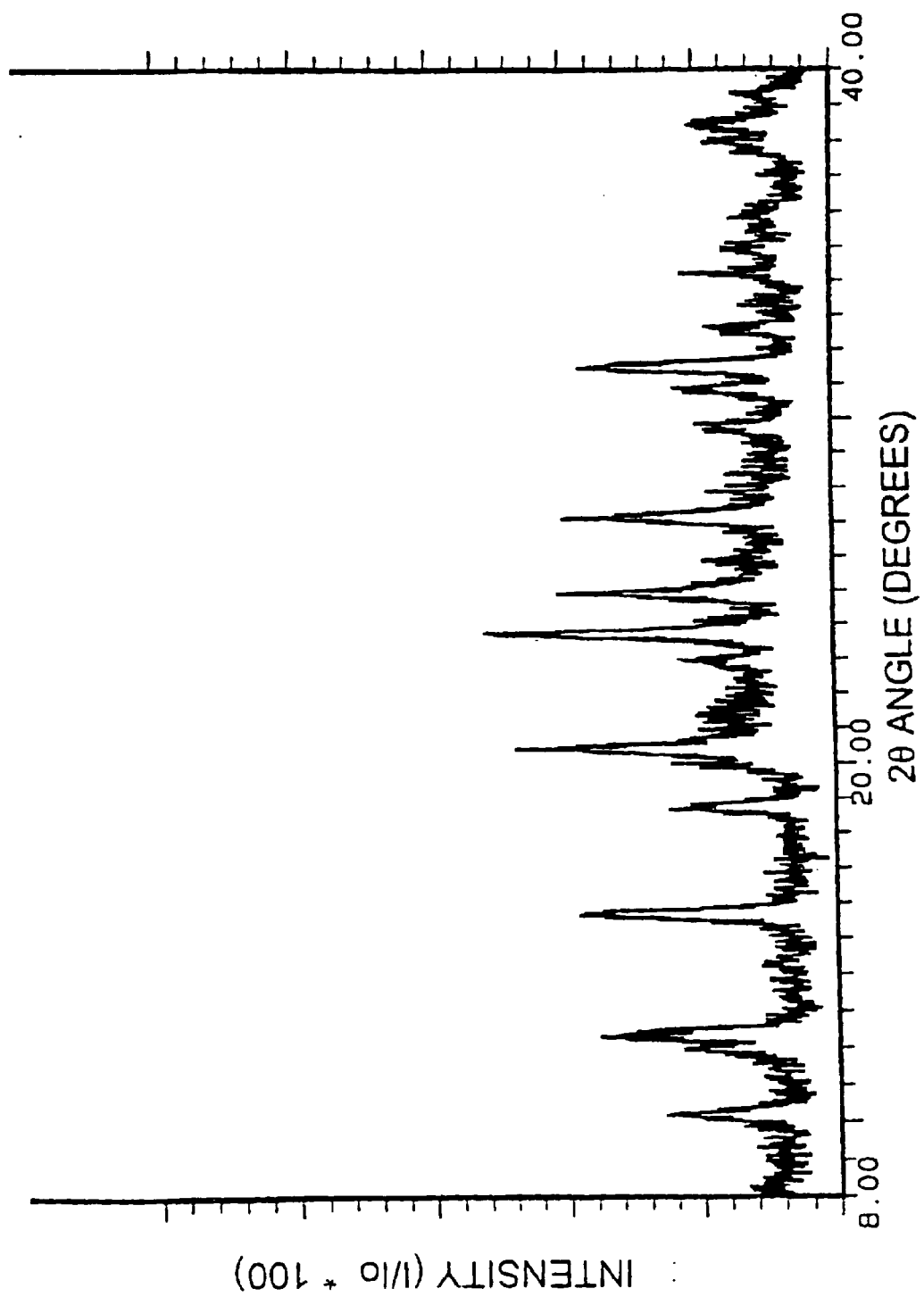
FIG. 6 illustrates the X-ray diffractogram (XRD) of the microspheres which contain the Y zeolite obtained by steam treatment of the microspheres of FIG. 5.

FIG. 6 illustrates the diffractogram revealed for the catalyst microspheres after the steam treatment and indicates the formation of type Y zeolite.

Figure 7:
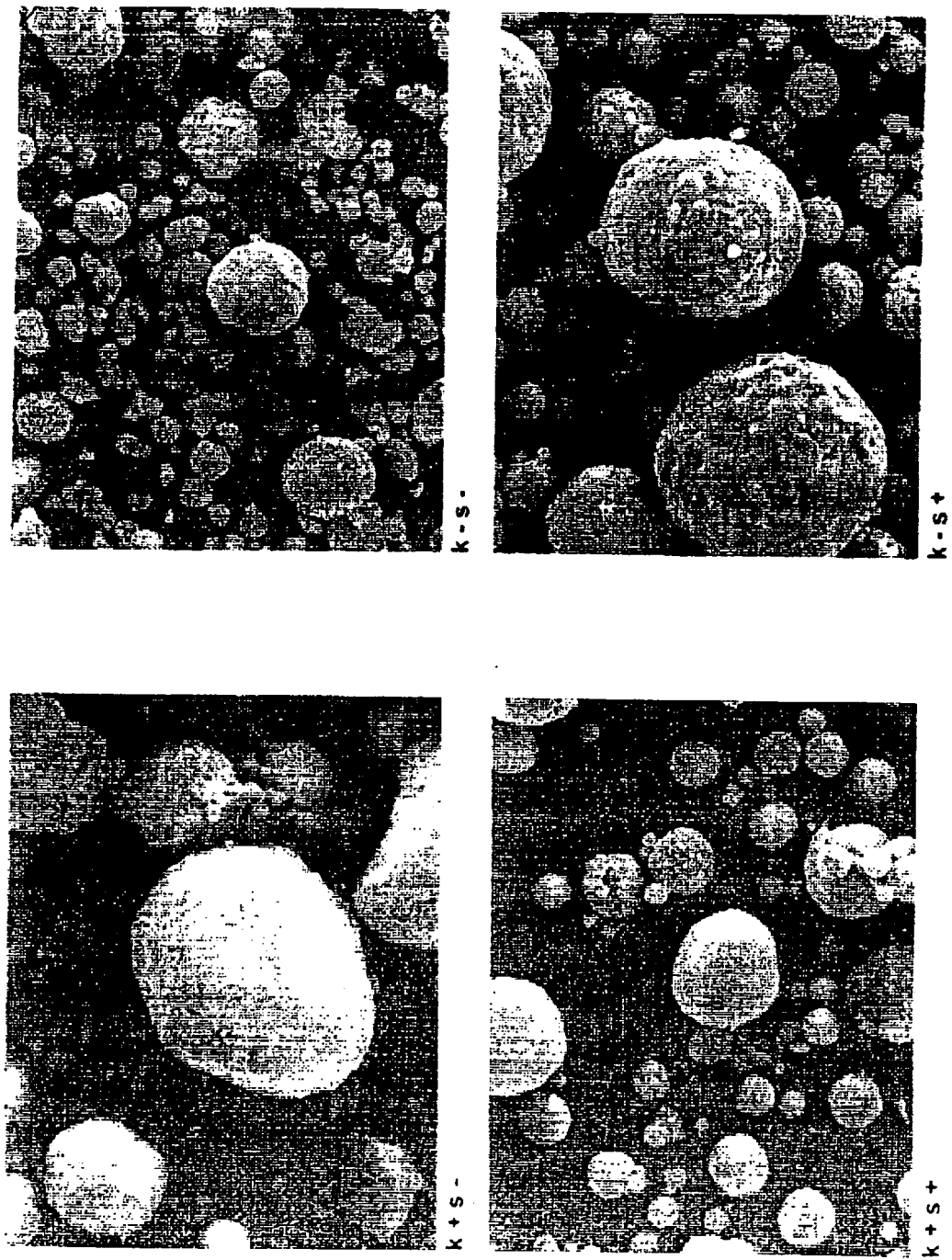
FIG. 7 illustrates the scanning electronic microscopy (SEM) of the microspheres which contain various precursors of Table 4 before the steam treatment.
Figure 8:
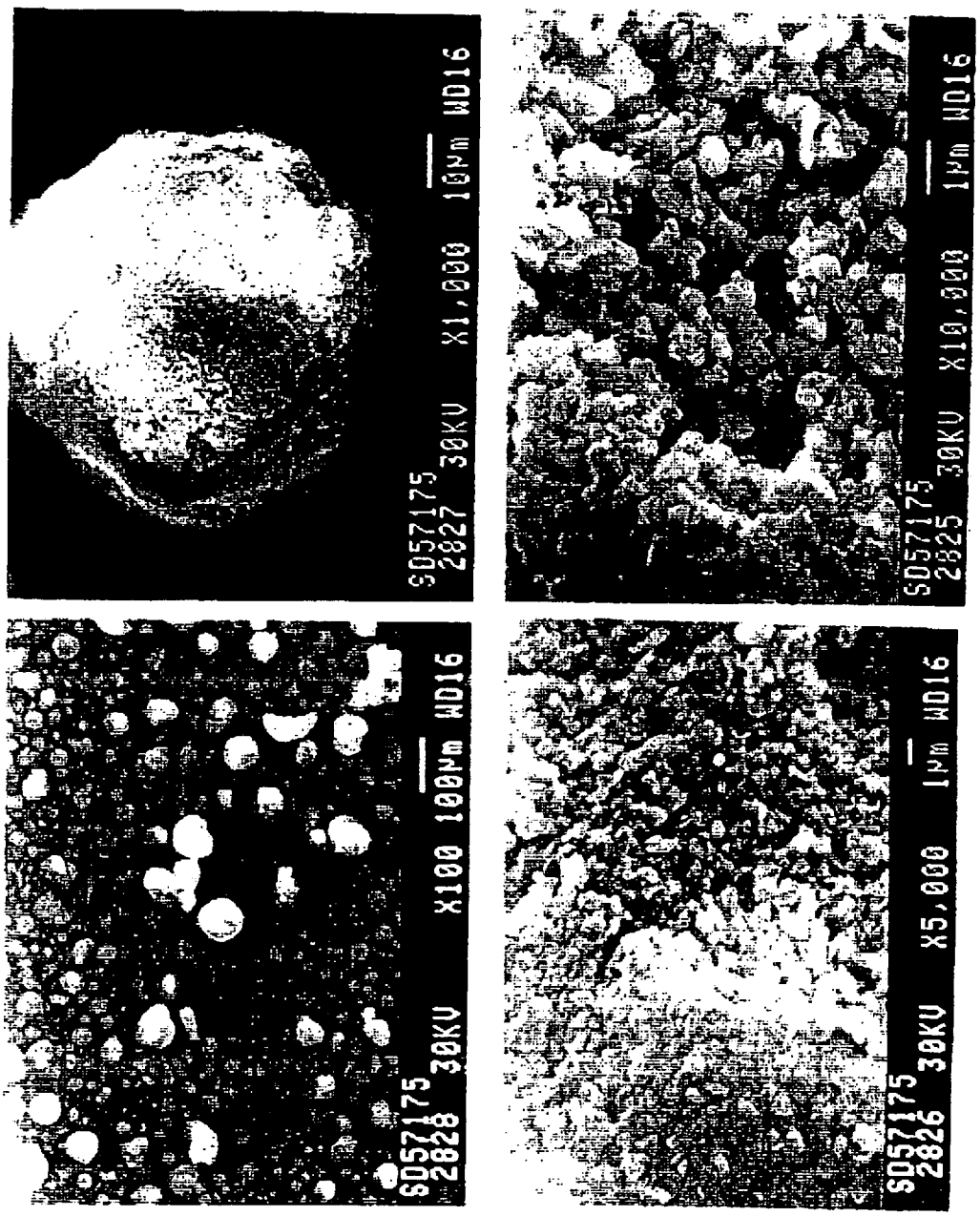
FIG. 8 illustrates the scanning electronic microscopy (SEM) of the microspheres which contain the Y zeolite obtained by steam treating the microspheres of FIG. 7, at different magnifications (100, 1,000, 5,000, and 10,000).

The way an amorphous precursor gel turns into a crystalline phase of a type Y zeolite may be better perceived by way of the scanning electron microscopy technique (SEM) as illustrated in FIGS. 7 and 8. It was clearly found that there was no destruction or modification of format of the catalyst microspheres after treatment with steam. These figures also show the Y zeolite crystals resulting from the treatment of precursor microspheres with steam.

The contents of Y zeolite prepared in the pre-shaped microspheres through the process of the present invention show that it is possible to obtain Y zeolite contents higher than 50 weight %. The experts in the field of the synthesis of cracking catalysts are aware of the difficulties in obtaining such high zeolite contents in a catalyst microsphere: generally the high zeolite contents will considerably impair the physical properties of the catalyst, besides causing further difficulties during the preparation of the suspension for drying and forming of the microspheres. With the aid of the process of the present invention such difficulties are nearly eliminated, giving way to the preparation of further families of fluid cracking catalysts having a high content of type Y zeolite.

COMPARATIVE EXAMPLE 2

This Example illustrates a trial which consisted of forming a type Y zeolite in pre-shaped microspheres containing the precursor gel prepared as described in Example 1 and placed in an aqueous suspension as used in the state-of-the-art crystallization of zeolites techniques.

Thus the same precursors as prepared for Example 5 were subjected to a crystallization of type Y zeolite in the aqueous phase, the suspension having around 30 weight % solids. TABLE 5 lists the results.

TABLE 5

| Sample | Kaolin content k | Silicate content s | Y % overall sample 48 h | 72 h |
|---|---|---|---|---|
| I1 | + | + | 0 | 7 |
| J1 | − | + | 0 | 9 |
| L1 | + | − | 0 | 4 |
| M1 | − | − | 0 | 4 |

Data from TABLE 5 was obtained in the same way as for Example 5, that is, the kaolin levels (k) were 55 weight % (+) and 25 weight % (−) while the sodium silicate (s) levels were 10 and 0 weight %. After 72 hours of crystallization in an aqueous medium at 100° C., only 9 weight % zeolite Y was obtained. This data clearly shows that in the process of crystallizing Y zeolite in an aqueous medium from pre-shaped microspheres, type Y zeolite is not as efficiently prepared as it is according to the process of the present invention.

EXAMPLE 6—USE OF TYPE Y ZEOLITE ON PRE-SHAPED MICROSPHERES USEFUL AS A FCC CATALYST

This Example illustrates the preparation and the catalyst activity tests of FCC catalysts prepared according to the process of the present invention.

The catalyst microspheres I and J of Table 4 of Example 5 were washed with an ammonium sulfate [$(NH_4)_2SO_4$] solution at 45° C. to remove sodium, as is usually practised in the preparation of cracking catalysts, yielding the catalyst samples N and O, which were tested in a microactivity test (MAT) against a commercial catalyst which contained around 40 weight % Y zeolite.

TABLE 6

| Sample | Treatment | Y (%) | SAR | Na₂O (%) | Al₂O₃ (%) | SiO₂ (%) | part. diameter (micra) | Surf. area (m²/g) | Vol. of Microp. (ml/g) |
|---|---|---|---|---|---|---|---|---|---|
| I | steam. 72 h | 16 | 3.17 | 4.83 | 33.1 | 61.7 | 37 | 123 | 0.05 |
| I washed | NaOH. 1 N. 80° C., 90 min | 20 | 2.54 | 4.71 | 38.0 | 56.8 | 36 | 206 | 0.08 |
| Cat N | washed and 600° C./1 h | 14 | 2.54 | 0.49 | 39.5 | 59.1 | 36 | 151 | 0.05 |
| J | steam. 72 h | 37 | 4.2 | 7.31 | 26.6 | 65.8 | 34 | 240 | 0.10 |
| J washed | NaOH. 1 N. 80° C., 90 min | 47 | 3.07 | 7.04 | 33.1 | 59.6 | 40 | 399 | 0.17 |
| Cat O | washed and 600° C./1 h | 42 | 3.11 | 0.66 | 34.7 | 63.4 | 40 | 304 | 0.12 |
| Commercial catalyst | — | 40 | 4.63 | 0.21 | 26.2 | 71.4 | 50 | 291 | 0.10 |

TABLE 6 above lists the results of the characterization of the cracking catalyst samples prepared according to the process of the present invention.

Under the heading "Treatment" are indicated the treatments to which the samples were subjected: with steam, for 72 hours, according to the invention and as described in Example 1, removal of the amorphous phase through washing with a sodium hydroxide solution, according to the present invention and as described in Example 2, and washing with an ammonium sulfate solution to lower the sodium content and calcination with 100% steam at 600° C. for one hour to stabilize the zeolites, as is usually practised by the experts in the preparation of fluid catalytic cracking catalysts.

Elemental analyses (Na₂O, Al₂O₃ and SiO₂) were performed by means of X-ray fluorescence (XRF); lowering of the silica content resulting from washing with the sodium hydroxide solution may follow, as well as lowering of the sodium oxide content after washing with ammonium sulfate.

It would thus be apparent to experts in the field of the preparation of fluid catalytic cracking that several other types of Y zeolite-containing catalysts may be prepared using the principles of the present invention. The Y zeolite obtained through steam treatment of the precursor gel-containing microspheres may optionally be exchanged with rare earth metal-containing compounds such as rare earth metal salts and oxides, the contents of which may vary between 0 and 6 weight % (calculated as the oxides) and/or ammonium salts.

The commercial sample used as control in the catalyst activity test is a catalyst, devoid of rare earth oxides, having 40 weight % ultra-stable Y zeolite. The surface area and the pore volume are consistent with the zeolite content of the sample.

TABLE 7 lists the results of the bench scale evaluation (MAT) of catalysts samples prepared according to the present invention as compared to the commercial catalyst above, the samples being characterized in TABLE 6.

TABLE 7

| Cat. | % Y | Conversion (%) at cat/oil 4.5 | Yield to iso-conversion of 45% (weight) | | | | |
|---|---|---|---|---|---|---|---|
| | | | gas (%) | Gasoline (%) | LCO (%) | coke (%) | Residue (%) |
| N | 14 | 42.1 | 1.8 | 34.8 | 22.4 | 1.8 | 32.6 |
| O | 42 | 78.6 | 1.3 | 36.6 | 21.4 | 1.0 | 33.6 |
| Control | 40 | 40.1 | 2.1 | 34.2 | 19.4 | 1.4 | 35.6 |

The data of Table 7 clearly indicates that the catalysts prepared with the Y zeolite of the present invention show high catalytic activity in the microactivity test (MAT) used in the lab scale evaluation of catalysts for a fluid catalytic cracking unit.

A comparison of the conversion for the same catalyst/oil ratio shows a higher activity for the N and O catalysts prepared according to the principles of the present invention than for the commercial (control) catalyst. Catalyst N's activity, in spite of a significantly lower content of Y zeolite, is equivalent to that of the commercial catalyst with nearly 40% of zeolite.

Iso-conversion to 45% confirms that the selectivity of the N and O catalysts is equivalent to that of the commercial control catalyst.

The observed higher activity could be explained on the basis of the heterogeneous distribution of Y zeolite in the catalyst microspheres. When Y zeolite is formed in the pre-shaped microspheres as described and claimed in the present invention, the forming of the zeolite occurs preferably in the outer layers of the microspheres, which favour the crystallization of the zeolite in those areas. As the Y zeolite is the active and selective phase of the FCC catalyst, the hydrocarbon feed will contact that phase more quickly and more efficiently than in the state-of-the-art catalysts, where the zeolite is uniformly distributed within the catalyst microspheres. This concept is to be applied to all pre-shaped bodies prepared according to the present invention.

We claim:

1. A process for preparing a molecular sieve of faujasite structure of the Y type, which comprises the following steps:

a) preparing a precursor gel from a source of silica-alumina or a source of alumina and a source of silica and an inorganic template agent, the $SiO_2/Al_2O_3$ molar ratio being greater than 7 and such as to lead to a zeolite having a Y type faujasite zeolite, in the sodium form;
b) drying the precursor gel of the Y zeolite;
c) steam treating the dried precursor gel of the Y zeolite under such temperature and time conditions as to obtain the zeolite product having a Y type faujasite structure zeolite.

2. The process of claim 1 wherein in step a) the $SiO_2/Al_2O_3$ molar ratio of the source of silica-alumina is between about 1 and about 15.

3. The process of claim 1 wherein in step a) the $SiO_2/Al_2O_3$ molar ratio of the source of silica-alumina is between about 5 and about 9.4.

4. The process of claim 1 wherein the molar composition of the inorganic template agent is NAR between about 12 and about 16, SAR 14 to 15, HAR about 187 to about 320, and the content of such template agent is between about 0.2 and about 12 weight %.

5. The process of claim 1 wherein the molar composition of the inorganic template agent is NAR between about 12 and about 16, SAR 14 to 15, HAR about 187 to about 320, and the content of such template agent is between about 1 and about 5 weight %.

6. The process of claim 1 wherein in step a) the precursor gel of type Y zeolite shows a $SiO_2/Al_2O_3$ molar ratio between about 5 and about 12.

7. The process of claim 1 wherein in step a) the precursor gel of type Y zeolite shows a $SiO_2/Al_2O_3$ molar ratio between about 5.5 and about 10.4.

8. The process of claim 1 wherein in step b) the drying of the precursor gel of the type Y zeolite is effected in the drying devices usually employed for the drying of aqueous suspensions of particulates, such as stoves, ovens, and the like.

9. The process of claim 8 wherein the temperature for drying the precursor gel of type Y zeolite is in the range of from about 25 to about 140° C.

10. The process of claim 9 wherein the temperature for drying the precursor gel of type Y zeolite is in the range of from about 100 to about 130° C.

11. The process of claim 8 wherein the period of time for drying the precursor gel of type Y zeolite is of from about 3 to about 24 hours.

12. The process of claim 11 wherein the period of time for drying the precursor gel of type Y zeolite is of from about 16 to about 18 hours.

13. The process of claim 1 wherein in step b) the precursor gel of type Y zeolite is obtained as a powder.

14. The process of claim 1 wherein the precursor gel of type Y zeolite obtained in step b) is subjected to molding processes so as to generate pre-shaped bodies.

15. The process of claim 1 wherein the steam treatment is effected on the precursor gel of type Y zeolite as a powder.

16. The process of claim 1 wherein the steam treatment is effected on pre-shaped bodies of precursor gel of type Y zeolite.

17. The process of claim 16 wherein the steam treatment is effected on the precursor gel of type Y zeolite pre-shaped as pellets.

18. The process according of claim 17 wherein the composition of the pellet of the precursor gel of type Y zeolite comprises of from 0 to about 50 weight % of an inorganic matrix and pelletization aids, and of from 0 to about 30 weight % of catalytically active metals.

19. The process of claim 1 wherein the steam treatment is effected on the precursor gel of type Y zeolite which is pre-shaped as extrudates.

20. The process of claim 19 wherein the composition of the extrudate of the precursor gel of type Y zeolite comprises of from 0 to about 50 weight % of an inorganic matrix and extrusion aids, and of from 0 to about 30 weight % of catalytically active metals.

21. The process of claim 1 wherein the steam treatment is effected on a membrane prepared with the precursor gel of type Y zeolite.

22. The process of claim 21 wherein the composition of the membrane prepared with the precursor gel of type Y zeolite comprises of from 0 to about 10 weight % of catalytically active metals.

23. The process of claim 1 wherein the steam treatment is effected on microspheres obtained by spray-drying of an aqueous suspension of the precursor gel of type Y zeolite.

24. The process of claim 23 wherein the solids content of the aqueous suspension of precursor gel of type Y zeolite is of from about 15 to about 25 weight %.

25. The process of claim 23 wherein the solids content of the aqueous suspension of precursor gel of type Y zeolite is about 20 weight %.

26. The process of claim 23 wherein the composition of the microspheres which contain the precursor gel of type Y zeolite comprises of from 0 to about 55 weight % of kaolin and of from 0 to about 20 weight % of sodium silicate and of from 0 to about 10 weight % of rare earth oxides.

27. The process of claim 1 wherein the steam treatment is effected by contacting the dried precursor gel of type Y zeolite obtained in step b) with steam at about 100° C.

28. The process of claim 27 wherein the treatment period of the dried precursor gel of type Y zeolite with steam is of from about 15 to about 80 hours.

29. The process of claim 27 wherein the treatment period of the dried precursor gel of type Y zeolite with steam is of from about 48 to about 72 hours.

30. The process of claim 1 wherein excess unreacted silica is withdrawn from the type Y zeolite product by washing with an aqueous dilute caustic solution.

31. The process of claim 30 wherein the aqueous dilute caustic solution is a solution of sodium hydroxide or potassium hydroxide.

32. The process of claim 31 wherein the concentration of the solution of sodium hydroxide or potassium hydroxide is from about 0.1 to about 1 N.

33. The process of claim 32 wherein the concentration of the solution of sodium hydroxide or potassium hydroxide is from about 0.5 to about 1 N.

34. The process of claim 30 wherein the washing is effected at temperatures between 20 and 90° C.

35. The process of claim 34 wherein the washing is effected at temperatures between about 65 and about 80° C.

36. The process of claim 30 wherein the washing period is of from about 30 to about 150 minutes.

37. The process of claim 30 wherein the washing period is about 60 minutes.

38. A pre-shaped body comprising type Y molecular sieve faujasite wherein the preparation of the type Y zeolite comprises the following steps:
a) preparing a precursor gel from a source of silica-alumina or a source of alumina and a source of silica and a template agent, the $SiO_2/Al_2O_3$ molar ratio being greater than 7 and such as to lead to a zeolite having a Y type faujasite zeolite, in the sodium form;
b) shaping and drying the precursor gel of the Y zeolite;

c) steam treating the shaped precursor gel of the Y zeolite under such temperature and time conditions as to obtain the zeolite product having a Y type faujasite structure zeolite, said pre-shaped body having faujasite structure zeolite crystals covering its surface the zeolite being more highly concentrated in the area nearer to the surface of the pre-shaped body.

39. A catalyst composition comprising the pre-shaped body of claim 38.

40. A fluid catalytic cracking process in which the catalyst composition of claim 39 is used.

41. A hydroprocessing process in which the catalyst composition of claim 39 is used.

* * * * *